US009242274B2

(12) United States Patent
Ho et al.

(10) Patent No.: US 9,242,274 B2
(45) Date of Patent: Jan. 26, 2016

(54) PRE-CHARGED CMUTS FOR ZERO-EXTERNAL-BIAS OPERATION

(71) Applicant: The Board of Trustees of the Leland Stanford Junior University, Palo Alto, CA (US)

(72) Inventors: Min-Chieh Ho, Palo Alto, CA (US); Mario Kupnik, Cottbus (DE); Butrus T. Khuri-Yakub, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 441 days.

(21) Appl. No.: 13/649,003

(22) Filed: Oct. 10, 2012

(65) Prior Publication Data

US 2013/0088118 A1 Apr. 11, 2013

Related U.S. Application Data

(60) Provisional application No. 61/545,805, filed on Oct. 11, 2011.

(51) Int. Cl.
*H02N 1/08* (2006.01)
*B06B 1/02* (2006.01)

(52) U.S. Cl.
CPC .................................. *B06B 1/0292* (2013.01)

(58) Field of Classification Search
CPC .................................. H02N 1/00; H02N 1/08
USPC .......................................... 310/300, 308, 309
See application file for complete search history.

(56) References Cited

U.S. PATENT DOCUMENTS

| | | | | |
|---|---|---|---|---|
| 4,524,247 | A * | 6/1985 | Lindenberger et al. | 381/173 |
| 4,954,789 | A * | 9/1990 | Sampsell | 359/318 |
| 7,274,623 | B2 | 9/2007 | Bayram et al. | |
| 7,675,221 | B2 | 3/2010 | Machida et al. | |
| 2005/0219953 | A1 | 10/2005 | Bayram et al. | |
| 2009/0322181 | A1 | 12/2009 | Machida et al. | |
| 2010/0207485 | A1 | 8/2010 | Dirksen et al. | |
| 2011/0040189 | A1 | 2/2011 | Petruzzello et al. | |
| 2011/0227448 | A1 * | 9/2011 | Kandori et al. | 310/300 |
| 2012/0010538 | A1 | 1/2012 | Dirksen | |

* cited by examiner

*Primary Examiner* — Michael Andrews
(74) *Attorney, Agent, or Firm* — Lumen Patent Firm

(57) ABSTRACT

Capacitive micromachined ultrasonic transducers (CMUTs) having a pre-charged floating electrode are provided. Such CMUTs can operate without an applied DC electrical bias. Charge can be provided to the floating electrode after or during fabrication in various ways, such as injection by an applied voltage, and injection by ion implantation.

6 Claims, 7 Drawing Sheets

PRE-CHARGED CMUTS FOR ZERO-EXTERNAL-BIAS OPERATION

CROSS REFERENCE TO RELATED APPLICATIONS

This application claims the benefit of U.S. provisional patent application 61/545,805, filed on Oct. 11, 2011, entitled “Production of pre-charged CMUTs for zero-external-bias operation”, and hereby incorporated by reference in its entirety.

GOVERNMENT SPONSORSHIP

This invention was made with Government support under contract CA134720 awarded by the National Institutes of Health. The Government has certain rights in this invention.

FIELD OF THE INVENTION

This invention relates to capacitive micromachined ultrasonic transducers (CMUTs).

BACKGROUND

Capacitive micromachined ultrasonic transducers have been extensively investigated for many years in connection with various applications. In operation, a CMUT is typically biased using a DC electrical voltage that determines the operating point of the device. CMUT signals in operation are typically AC electrical or acoustic signals. For example, an applied AC electrical signal leads to emission of acoustic radiation from the CMUT (e.g., acoustic transmission), and an AC acoustic signal incident on a CMUT leads to generation of an AC electrical signal on the CMUT (e.g., acoustic reception).

In some cases, the use of a DC electrical bias in combination with AC signals on a CMUT can cause undesirable complications. Accordingly, it would be an advance in the art to reduce or eliminate the need for an applied DC bias in CMUT operation.

SUMMARY

Capacitive micromachined ultrasonic transducers having a pre-charged floating electrode are provided. Such CMUTs can operate without an applied DC electrical bias. Charge can be provided to the floating electrode in various ways during or after fabrication, such as injection by an applied voltage, and injection by ion implantation. Such pre-charged CMUTs are of interest for all CMUT applications, especially those requiring low external DC biasing, and battery operated applications. Example applications include, but are not limited to medical imaging applications, such as 3D/4D real-time ultrasonic imaging, intracardiac ultrasound imaging, and 3D photoacoustic functional imaging. Reducing/eliminating DC bias can be helpful for mobile applications, for low power design, and for compliance with safety regulations for medical applications.

DETAILED DESCRIPTION

Figure 1A:
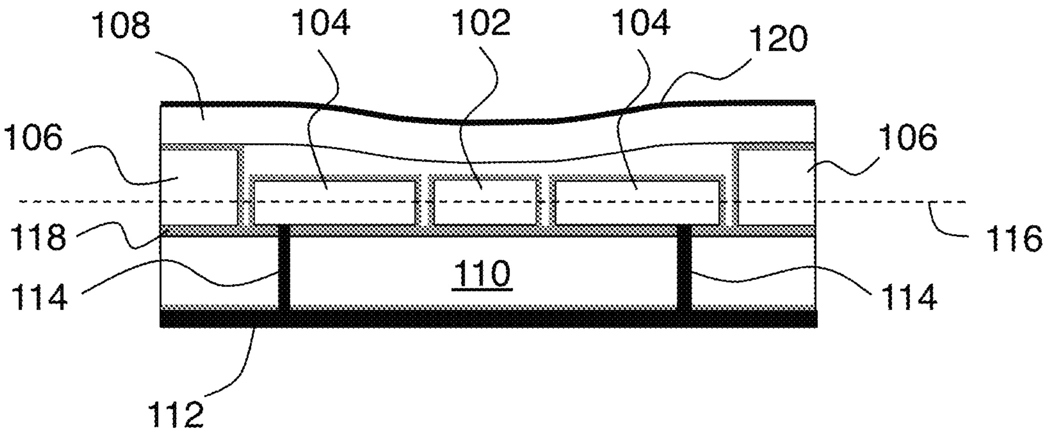
FIGS. 1*a-b* show cross section views of an exemplary embodiment of the invention.
Figure 1B:
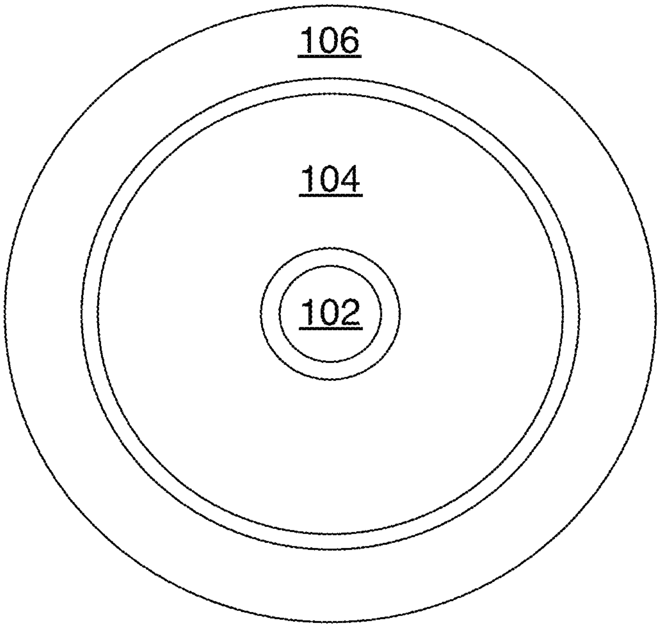

FIGS. 1*a-b* show an exemplary embodiment of the invention. FIG. lb shows a view along line 116 of FIG. 1*a*. In this example, the CMUT includes a CMUT plate 108 disposed above a substrate 110. A plate electrode 120 is disposed on the CMUT plate 108. A substrate electrode 104 is disposed on substrate 110. In this example, the substrate electrode 104 is connected to a back side contact 112 by one or more vias 114. The CMUT includes a floating electrode 102 that is not electrically connected to the substrate electrode 104 or to the plate electrode 120. Charge is trapped on floating electrode 102, and this trapped charge provides electrical DC bias for the CMUT (in full or in part). A standoff layer 106 defines the vertical separation between the CMUT plate 108 and the rest of the structure.

In an exemplary embodiment, substrate electrode 104 and floating electrode 102 are fabricated in silicon, and floating electrode 102 is insulated from the rest of the structure by oxide 118 (shown in gray on FIG. 1*a*). For simplicity, oxide 118 is not shown on the view of FIG. 1*b*. Practice of the invention does not depend critically on how the CMUT is fabricated—any fabrication approach that provides an electrically insulated floating electrode in addition to conventional CMUT electrodes can be employed. In the example of FIGS. 1*a-b*, a wafer bonding process with a thick-buried oxide layer is employed, which can result in oxide 118 being present as shown (e.g., surrounding substrate electrode 104 in addition to surrounding floating electrode 102). Any other CMUT fabrication process can also be employed (e.g., sacrificial release). However, at some point during or post fabrication, charges are trapped on the floating electrode. Such charge trapping can be accomplished in various ways. For example, an applied electrical bias can be increased to the point where charges spill over from another electrode (e.g., substrate electrode 104) onto floating electrode 102. Alternatively, ion implantation can be employed to inject charge onto the floating electrode.

Practice of the invention does not depend critically on the location of the floating electrode. For example, the floating electrode can be disposed either on the substrate or on the CMUT plate.

The following description relates to experiments on pre-charged CMUTs.

1) Introduction

We present long-term measurement result (>1.5 years) of CMUTs which have been pre-charged for zero-bias operation. In these experiments, the fabrication is based on a direct wafer bonding process with a thick buried oxide layer in the device silicon on insulator (SOI) wafer, which allows the realization of a donut shape bottom electrode surrounding a floating electrode in the center. The floating electrode is completely encapsulated by 3-um-thick silicon dioxide, and is thus electrically floating. In these experiments, the devices were pre-charged by applying a DC voltage higher than the pull-in voltage, which injects charges into the electrically floating portion and creates a sufficiently strong intrinsic electric field in the gap. Measurements of resonant frequency at various bias voltages show that the level of trapped charge has remained nearly constant for more than 1.5 years. We also demonstrate zero-external-bias operation with the pre-charged CMUTs by measuring the electrical impedance, the AC signal displacement, and pitch-catch under zero external DC bias. The following results show that pre-charged CMUTs are feasible and stable, and are capable of long-term, zero-external-bias operations.

2) The Charging Process & Characterization

The fabricated CMUTs, before charging, operated in the conventional mode (i.e., no contact between the plate and the bottom electrode under zero DC bias). We tested devices with radius 1800 um, plate thickness 30 or 60 um, gap height ~33 or ~8 um, and pull-in voltages ranging from 180 to 290 V. Later a DC charging voltage larger than the pull-in voltage was applied, bringing these CMUTs into collapse mode. The large electric field injects charges into the electrically floating electrode. Once the high DC charging voltage is removed, we monitored the charge by measuring the resonant frequency at various lower bias voltages over a time period of 19 months.

For example, one of the devices has 1800 um radius, 60 um thick plate, ~8 um gap, 3 um insulation layer, and a floating portion that is 50% in radius of the bottom electrode, and had a pull-in voltage that was 220 V originally. A DC charging voltage was applied onto the device, and increased gradually until it reached 550 V.

Afterwards, the DC charging voltage was removed, and the equivalent charged voltage was measured by the resonant frequency at various DC biasing voltages.

Figure 2A:
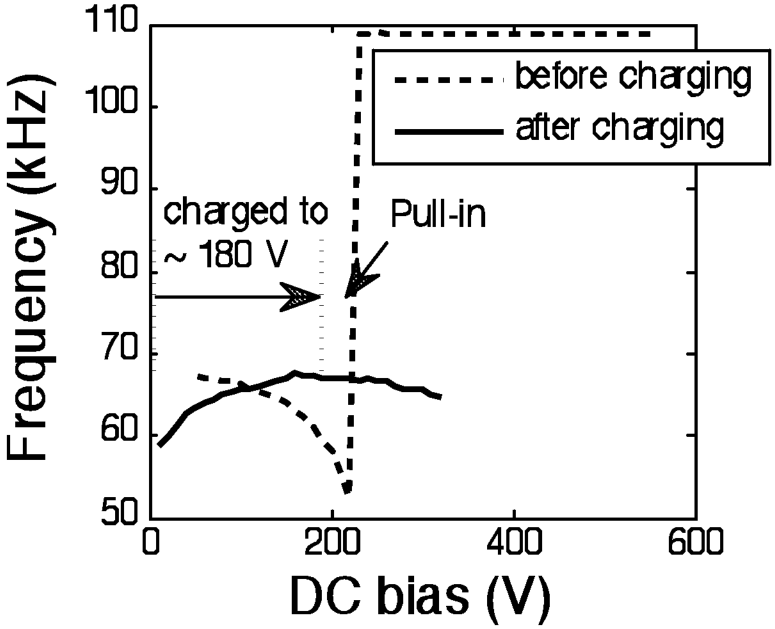
FIGS. 2*a-b* show experimental results of CMUT resonant frequency before and after charging.

The resonant frequency of this CMUT before and after charging is shown in FIG. 2*a*. The curve before charging shows a pull-in voltage at 220 V, and before pull-in, the device had a maximum resonant frequency at 0 V. As the DC voltage deviates from 0 V, the resonant frequency drops due to the spring softening effect. After charging, the maximum resonant frequency moved to ~180 V, which shows that the charges injected into the device cancel the electric field created by the 180 V external DC bias. Therefore, we know that this device is charged up to an equivalent of 180 V DC bias when no external bias is applied, which is ~82% of the pull-in voltage.

Figure 2B:
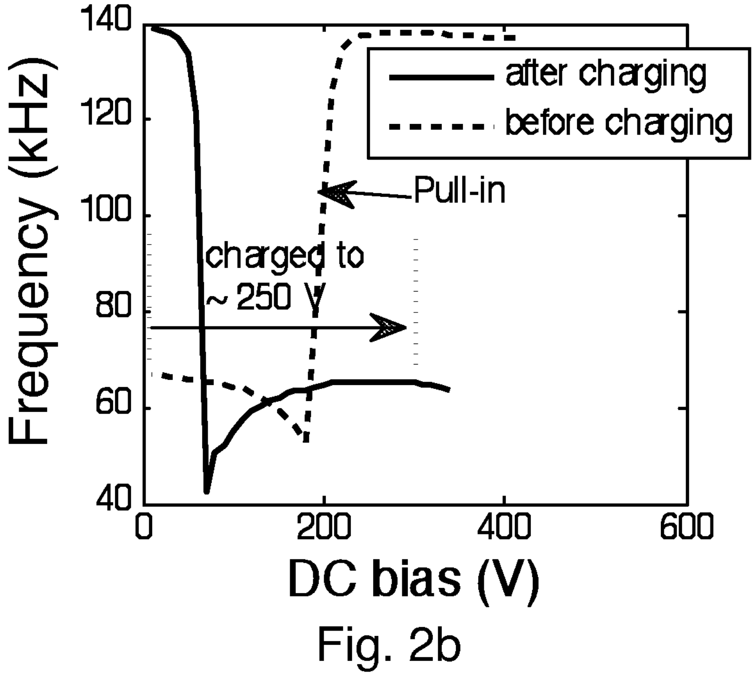

Another CMUT with pull-in voltage at 180 V was charged to an equivalent voltage of 250 V, which is larger than the pull-in voltage. Its resonant frequency before and after charging is shown in FIG. 2*b*. The electric field created by the injected charge is so large that the device operates in the pull-in mode when there is no external DC bias applied.

Figure 3A:
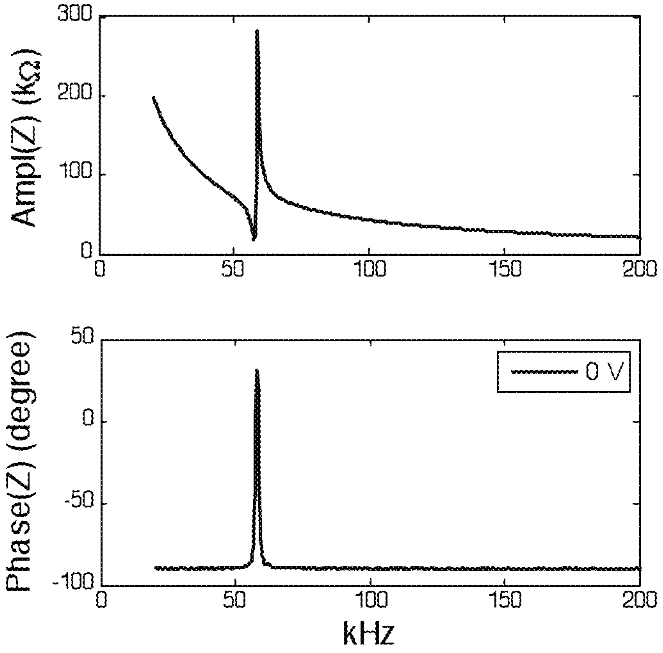
FIGS. 3*a-b* show experimental results of CMUT electrical impedance after charging.
Figure 3B:
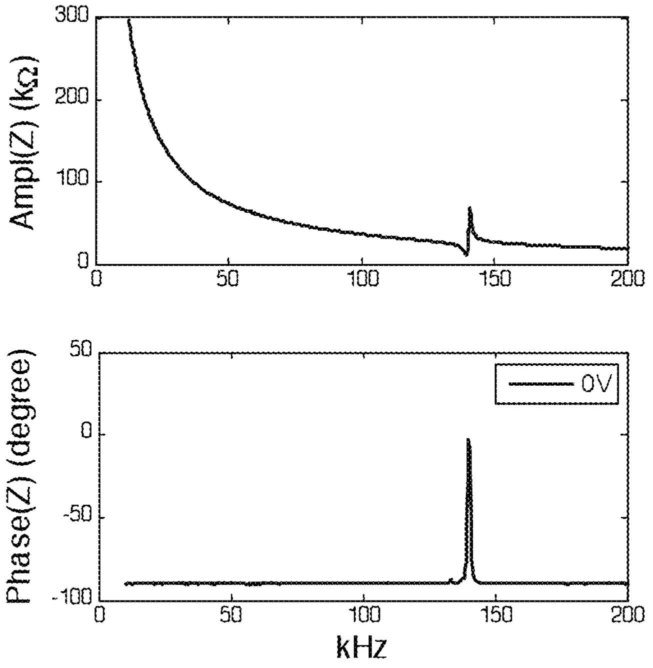

The electrical impedance of the above-mentioned CMUTs at zero-external-bias is shown in FIGS. 3*a-b*. FIG. 3*a* relates to a CMUT that is charged to ~82% of the original pull-in voltage. FIG. 3*b* relates to a CMUT charged to ~139% of the original pull-in voltage. Traditionally, conventional CMUTs operate with a constant DC voltage. Even though the pre-charged CMUTs operate with a constant charge, as opposed to constant voltage, we can see from FIGS. 3*a-b* that these devices show a strong resonance in impedance when no external bias is applied.

Figure 4:
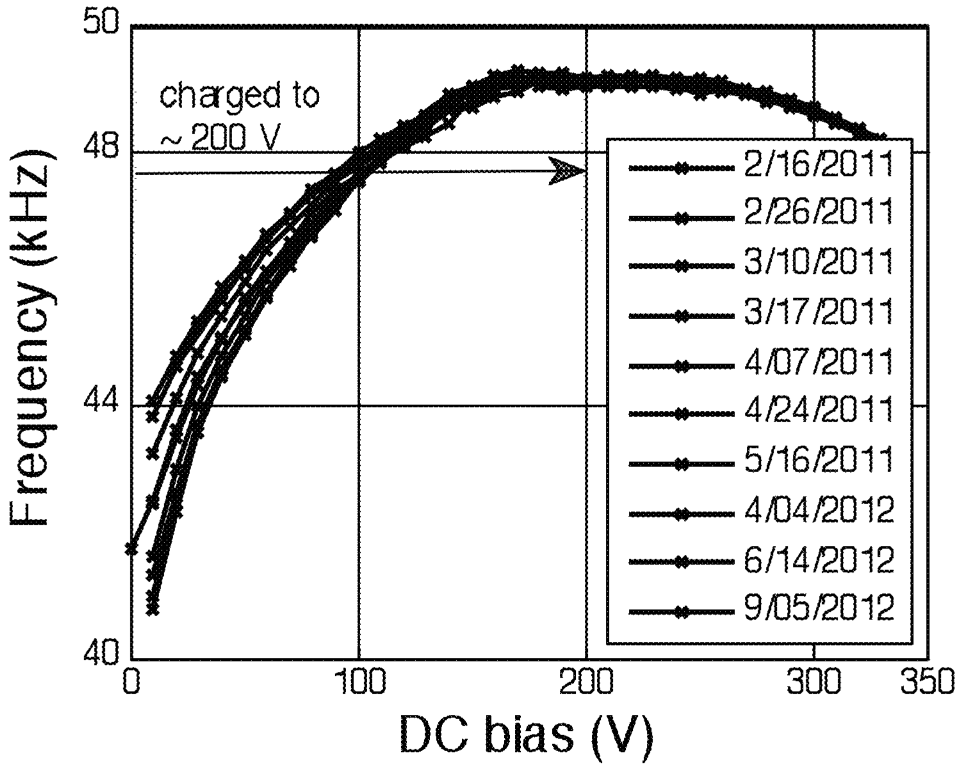
FIG. 4 shows long-term measurements of the short circuit resonance of a pre-charged CMUT.

For long-term monitoring, we measured a CMUT with 1800 um radius, 30 um thick plate, ~33 um gap, 3 um insulation layer, and a floating portion that is 25% in radius of the bottom electrode, and a pull-in voltage that was 290 V originally. A maximum charging DC voltage of 680 V was applied on this device, and it is charged to an equivalent of 200 V. This CMUT was monitored over a time period of 19 months (results shown on FIG. 4), and the charge injected stays nearly constant. During this long-term period, this device has been repetitively stressed by both AC (up to 10 Vpp for pitch-catch) and DC (up to 320 V for impedance measurement) signals, and so far no shift in the equivalent charged voltage can be noticed.

Similar results have been repeated on other devices, also showing stable charge storage in the device for 3 months even with AC and DC stressing in between. One device with no floating portion in the bottom electrode was also measured; the charge injected dissipated in ~1 hour of time. It is evident that the floating silicon encapsulated by oxide in the CMUT electrode does help with retaining the charge for long-term operation.

3) Zero-External-Bias Operations

3a) Displacement Measurements

Figure 5A:
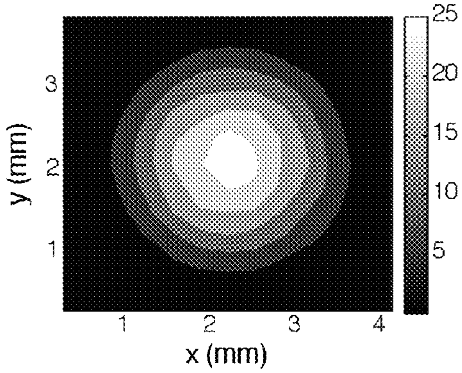
FIGS. 5*a-f* show displacement of three pre-charged CMUTs (at zero external bias) measured by vibrometer.
Figure 5B:
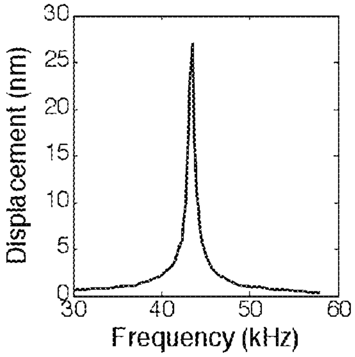
Figure 5C:
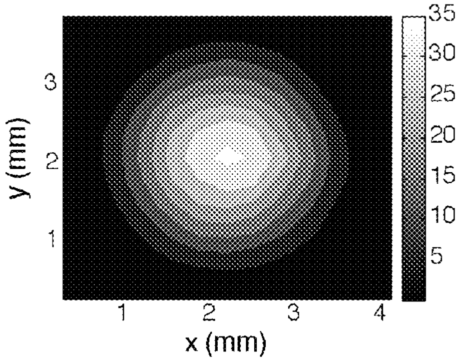
Figure 5D:
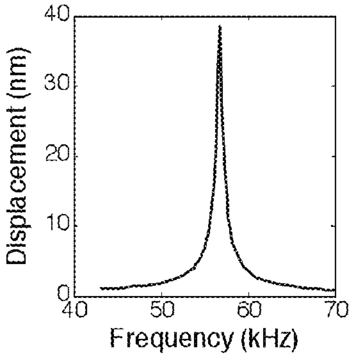
Figure 5E:
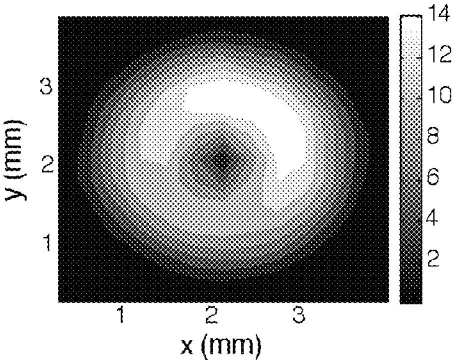
Figure 5F:
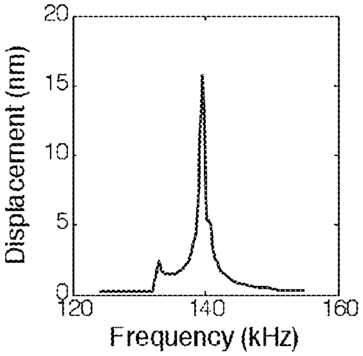

FIGS. 5*b*, 5*d* and 5*f* show displacement measurements (maximum displacement as a function of AC input frequency) of three pre-charged CMUTs with no external bias using an optical fiber interferometer (Polytec, Irvine, Calif., USA). FIGS. 5*a*, 5*c*, and 5*e* show 2D displacement plots corresponding to FIGS. 5*b*, 5*d*, and 5*e* respectively. The device in FIGS. 5*a-b* has 1800 um radius, 30 um thick plate, 33 um gap, and a floating portion that is 25% in radius of the bottom electrode. The device has a resonant frequency at 43.5 kHz, and gives a maximum displacement of 27 nm at 60 mVpp AC input. If we assume the displacement scales with the AC input, this device can achieve 140 dB relative to sound pressure level (SPL, i.e., 20 μPa) with a mere 11.8 Vpp AC input, which gives ~1.77 um average displacement. The device in FIGS. 5*c-d* has a thicker plate (60 um), smaller gap (8 um), and a floating portion that is 50% in radius of the bottom electrode. The device performance under zero-external bias is equally impressive: at the resonant frequency at 56.75 kHz, it gives a maximum displacement of 38 nm at 60 mVpp AC input. Assuming the displacement scales with the AC input, this device can achieve 140 dB re SPL with a mere 6.44 Vpp AC input, which gives ~1.36 um average displacement.

Similar results can be found in a CMUT charged to pull-in mode. The device in FIGS. 5*e-f* has 1800 um radius, 60 um thick plate, 8 um gap, and a floating portion that is 50% in radius of the bottom electrode, and was charged to 139% of the original pull-in voltage. The device has a higher resonant frequency at 139.5 kHz, and gives a maximum displacement of 15 nm at 60 mVpp AC input.

3b) Pitch-Catch Measurements

Figure 6:
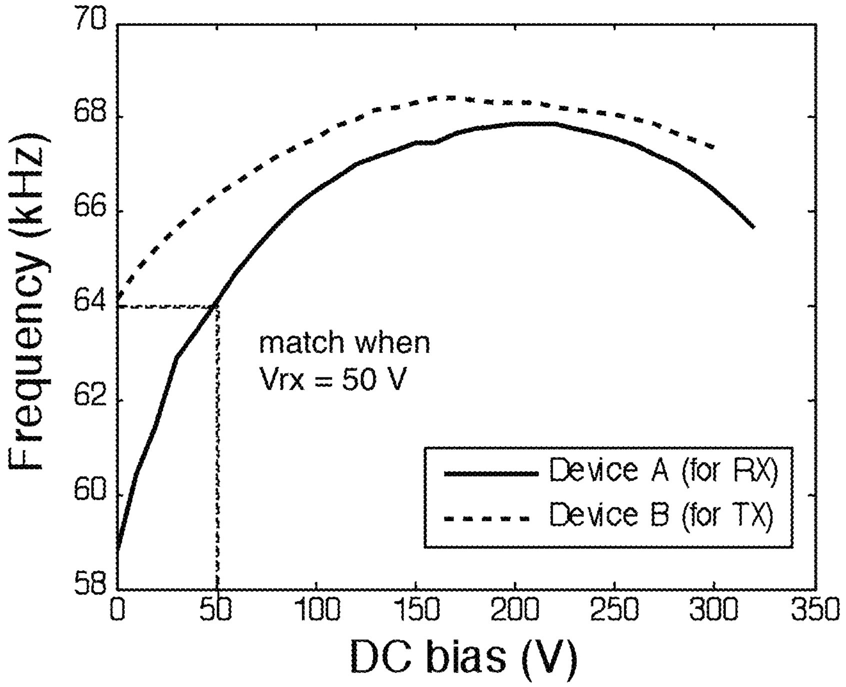
FIG. 6 shows resonant frequencies of a pitch-catch CMUT pair at various external DC biases.

The pitch-catch measurement was carried out in either of two conditions: (1) no external bias on either of the 2 devices; or (2) a bias of 50 V applied to the receiving device to match the frequencies of the pair. The method of frequency matching between the pitch-catch device pair is based on the frequency measurement shown in FIG. 6. This plot shows the resonant frequencies of the pitch-catch pair at various external DC biases. The 2 CMUTs operate at ~64 kHz and ~59 kHz respectively with no external bias.

Frequencies of the 2 devices match when 50 V of external bias is applied to the receiving CMUT.

Figure 7A:
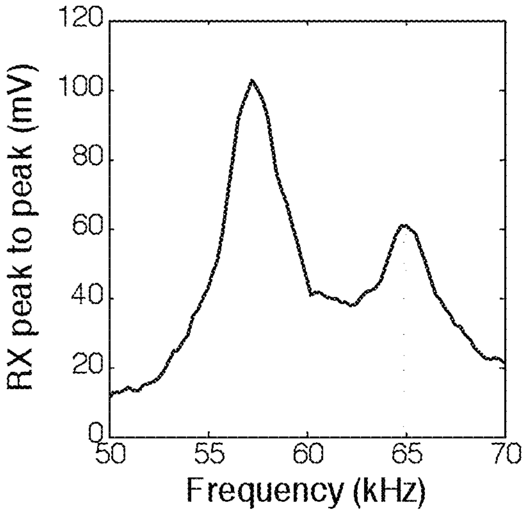
FIGS. 7*a-d* show pitch catch measurements of a pair of pre-charged CMUTs.
Figure 7B:
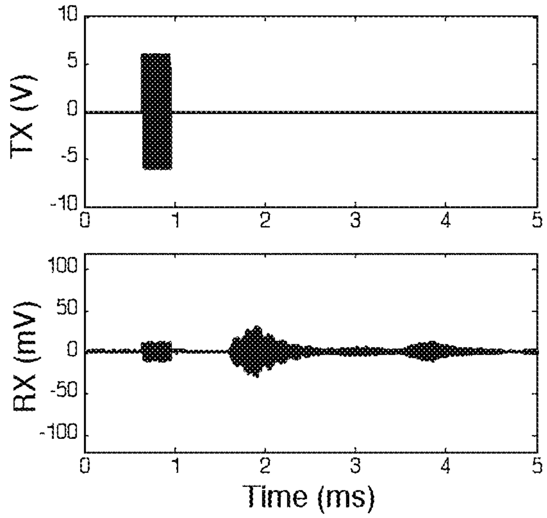
Figure 7C:
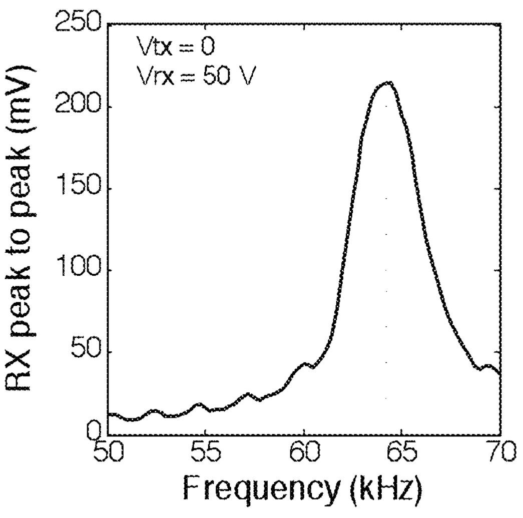
Figure 7D:
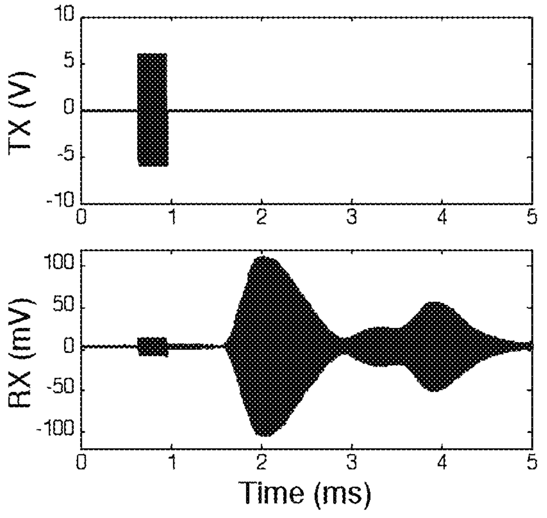

FIGS. 7*a-d* show pitch catch measurement of a pair of pre-charged CMUTs. FIGS. 7*a-b* show the results of no external bias applied to either of the CMUTs, while FIGS. 7*c-d* show results where a bias of 50 V is applied to the receiving device to match the frequencies of the pair. FIGS. 7*a* and 7*c* are the peak to peak value of the received signal at different frequencies, while FIGS. 7*b* and 7*d* are the corresponding time domain signals of the pitch-catch at ~64.5 kHz.

The pitch-catch measurement is done with a distance of 30 cm between the devices, an AC signal of 20-cycle, 12 Vpp sinusoidal burst as excitation source, and a pre-amplifier of 40 dB on the receiving side. Due to the frequency mismatch of the pair of the devices, the pitch-catch signal with no-external-bias applied shows 2 peaks in the spectrum (FIG. 7*a*), and the time domain signal contains some beating (FIG. 7*b*). With a low external DC bias of 50 V applied to only 1 of the devices, the pitch catch spectrum in FIG. 7*c* has a single peak, and the time domain signal in FIG. 7*d* looks much cleaner.

In either case, it is evident that these pre-charged CMUTs are capable of doing pitch-catch under no external DC bias and can still give signals with good signal-to-noise ratio.

4) Conclusion

We present long-term measurement results of a CMUT with a partially floating bottom electrode. By injecting charges, the device is capable of zero-bias operation. Such a CMUT structure can simplify the circuit design in terms of external dc bias circuitry, mobile applications, low power design, and safety regulations for medical applications.

The invention claimed is:

1. A capacitive micromachined ultrasonic transducer (CMUT) comprising:

a substrate;

a CMUT plate disposed above the substrate;

a substrate electrode disposed on the substrate;

a plate electrode disposed on the CMUT plate;

a floating electrode disposed either on the substrate or on the CMUT plate, wherein the floating electrode has no electrical connection to the substrate electrode or to the plate electrode; and wherein an electrical DC bias of the CMUT is provided in part or in full by charges trapped on the floating electrode;

wherein the CMUT is configured as a transducer relating an electrical capacitance formed by the substrate electrode and the plate electrode to an acoustic deformation of the CMUT plate.

2. The CMUT of claim 1, wherein the floating electrode has no electrical connection.

3. A method of making a capacitive micromachined ultrasonic transducer (CMUT), the method comprising:

providing a substrate;

providing a CMUT plate disposed above the substrate;

providing a substrate electrode disposed on the substrate;

providing a plate electrode disposed on the plate;

providing a floating electrode disposed either on the substrate or on the CMUT plate, wherein the floating electrode has no electrical connection to the substrate electrode or to the plate electrode; and trapping charge on the floating electrode to provide part or all of an electrical DC bias of the CMUT;

wherein the CMUT is configured as a transducer relating an electrical capacitance formed by the substrate electrode and the plate electrode to an acoustic deformation of the CMUT plate.

4. The method of claim 3, wherein the trapping charge comprises applying a voltage sufficient to inject charge onto the floating electrode.

5. The method of claim 3, wherein the trapping charge comprises ion implantation of charges on the floating electrode.

6. The method of claim 3, wherein the floating electrode has no electrical connection.

* * * * *